United States Patent
Kamigaito

(12) 
(10) Patent No.: US 10,919,706 B2
(45) Date of Patent: Feb. 16, 2021

(54) CONVEYOR APPARATUS AND COMBINED WEIGHING APPARATUS

(71) Applicant: Ishida Co., Ltd., Kyoto (JP)

(72) Inventor: Satoru Kamigaito, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 101 days.

(21) Appl. No.: 16/362,791

(22) Filed: Mar. 25, 2019

(65) Prior Publication Data
US 2019/0291967 A1    Sep. 26, 2019

(30) Foreign Application Priority Data
Mar. 26, 2018    (JP) .................................. 2018-057762

(51) Int. Cl.
| | |
|---|---|
| *B65G 43/08* | (2006.01) |
| *B65B 1/32* | (2006.01) |
| *B65G 47/44* | (2006.01) |
| *G01G 19/393* | (2006.01) |

(52) U.S. Cl.
CPC ................ *B65G 43/08* (2013.01); *B65B 1/32* (2013.01); *B65G 47/44* (2013.01); *G01G 19/393* (2013.01); *B65G 2203/0241* (2013.01); *B65G 2203/0291* (2013.01); *B65G 2203/041* (2013.01); *B65G 2203/042* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0114395 A1* | 5/2011 | Naiki | ........................ | B07C 5/18 |
| | | | | 177/52 |
| 2018/0023996 A1* | 1/2018 | Ikeda | ..................... | B65G 65/32 |
| | | | | 198/572 |
| 2018/0274970 A1* | 9/2018 | Nagai | .................. | G01G 19/387 |

FOREIGN PATENT DOCUMENTS

| | | |
|---|---|---|
| EP | 2312284 A1 | 4/2011 |
| EP | 3236220 A1 | 10/2017 |
| EP | 3258227 A1 | 12/2017 |
| JP | 2005-055187 A | 3/2005 |

OTHER PUBLICATIONS

The extended European search report issued by the European Patent Office dated Jul. 30, 2019, which corresponds to EP19163390.8-1001 and is related to U.S. Appl. No. 16/362,791.

* cited by examiner

*Primary Examiner* — Kyle O Logan

(74) *Attorney, Agent, or Firm* — Studebaker & Brackett PC

(57) ABSTRACT

A combined weighing apparatus 1 includes: a dispersion feeder 3 which conveys an article A supplied from the outside; a load cell 3b which detects an amount of the article A loaded on the dispersion feeder 3; and a control unit 14 which sets a force of conveying the article A in the dispersion feeder 3 on the basis of a detection result of the load cell 3b and controls an operation of the dispersion feeder 3 and the control unit 14 sets the conveying force of the dispersion feeder 3 to be smaller than a current conveying force when a state in which a change amount of the loading amount of the article A on the dispersion feeder 3 is smaller than a threshold value is maintained for a predetermined time or more in the detection result of the load cell 3b.

8 Claims, 3 Drawing Sheets

CONVEYOR APPARATUS AND COMBINED WEIGHING APPARATUS

TECHNICAL FIELD

The present invention relates to a conveyor apparatus and a combined weighing apparatus.

BACKGROUND

A combined weighing apparatus includes a conveyor apparatus which conveys an article, a plurality of weighing hoppers which temporarily store an article conveyed by the conveyor apparatus and calculate a measured weight value corresponding to the mass of the article, and a control unit which calculates a combination of measured weight values so that a total value becomes a target value from a plurality of measured weight values respectively correlated with the plurality of weighing hoppers (for example, see Japanese Unexamined Patent Publication No. 2005-55187).

SUMMARY

In the above-described conveyor apparatus, there is a case in which the supply of the article from the outside is temporarily stopped or the supply amount is decreased depending on an operation state or the like of an upstream device supplying the article to the conveyor apparatus. At this time, when the conveyor apparatus is operated by the same conveying force as that of a case in which the article is supplied in a normal state, power is consumed uselessly and hence this operation is not efficient.

An aspect of the present invention is to provide a conveyor apparatus and a combined weighing apparatus capable of realizing an efficient operation.

A conveyor apparatus according to an aspect of the present invention includes: a conveying unit which conveys an article supplied from the outside; a detection unit which detects an amount of an article loaded on the conveying unit; and a control unit which sets a force of conveying the article in the conveying unit on the basis of a detection result of the detection unit and controls an operation of the conveying unit, in which the control unit sets the conveying force of the conveying unit to be smaller than a current conveying force when a state in which a change amount of the article loading amount on the conveying unit is smaller than a threshold value is maintained for a predetermined time or more in the detection result of the detection unit.

In the conveyor apparatus according to an aspect of the present invention, the conveying force of the conveying unit is set to be smaller than the current conveying force when a state in which a change amount of the loading amount of the article on the conveying unit is smaller than the threshold value is maintained for a predetermined time or more. Accordingly, in the conveyor apparatus, the conveying force can be decreased when the article is not supplied to the conveying unit and/or the article adheres to the conveying unit so that the article is not conveyed. For that reason, in the conveyor apparatus, power is not consumed uselessly when there is no need to convey the article in the conveying unit. Thus, in the conveyor apparatus, power consumption can be reduced and hence an efficient operation can be realized. Further, in the conveyor apparatus, a load for the conveying unit can be reduced and hence durability can be improved.

In one embodiment, the control unit may set the conveying force of the conveying unit to be larger than the current conveying force when a state in which the change amount is smaller than the threshold value is maintained for a first predetermined time or more and set the conveying force of the conveying unit to be smaller than the current conveying force when a state in which the change amount is smaller than the threshold value is maintained for a second predetermined time or more which is a predetermined time and is equal to or longer than the first predetermined time. For example, it is possible to suppress a decrease in the article supply amount per unit time for each weighing hopper corresponding to a conveying destination by setting the conveying force of the conveying unit to be larger than the current conveying force when a state in which the change amount is smaller than the threshold value is maintained for a first predetermined time or more in a case in which the conveyor apparatus is used in the combined weighing apparatus. Accordingly, it is possible to suppress deterioration of operation efficiency of the apparatus provided with the conveyor apparatus. Meanwhile, it is possible to realize an efficient operation by setting the conveying force of the conveying unit to be smaller than the current conveying force when a state in which the change amount is smaller than the threshold value is maintained for a second predetermined time or more which is a predetermined time and is equal to or longer than the first predetermined time.

In one embodiment, the control unit may set the conveying force of the conveying unit to be larger than the current conveying force when the change amount is the threshold value or more after decreasing the conveying force. In this configuration, it is possible to immediately increase the conveying force of the conveying unit when the article is supplied to the conveying unit. For that reason, it is possible to promptly cope with a change in state in the conveyor apparatus.

In one embodiment, the control unit may set the conveying force of the conveying unit to be larger than the current conveying force when a state in which the change amount is the threshold value or more is maintained for a third predetermined time or more after decreasing the conveying force. In this configuration, the conveying force of the conveying unit can be increased when the article is stably supplied to the conveying unit. Thus, in the conveyor apparatus, since the conveying force is not large in a state in which the article is temporarily supplied, a more efficient operation can be realized.

In one embodiment, the control unit may change parameters setting the conveying force of the conveying unit to change the conveying force of the conveying unit. In this configuration, the conveying force of the conveying unit can be appropriately changed.

A combined weighing apparatus according to an aspect of the present invention includes: the above-described conveyor apparatus; a plurality of weighing hoppers which temporarily store the article conveyed by the conveyor apparatus and calculate a measured weight value corresponding to the mass of the article; and a combined control unit which calculates a combination of measured weight values so that a total value becomes a target value from the measured weight values respectively correlated with the plurality of weighing hoppers.

In the combined weighing apparatus, when the loading amount of the article on the conveying unit of the conveyor apparatus is small, the conveying force of the conveying unit is generally increased so that the article supply amount per unit time for each weighing hopper does not decrease. Accordingly, in the combined weighing apparatus, since it is possible to secure the number of the weighing hopper used to calculate a combination, deterioration of operation efficiency is suppressed. Here, when the article is not supplied to the combined weighing apparatus, the combined weighing apparatus does not need to perform a combination weighing process. In this state, when the conveying force of the conveying unit is increased due to the small loading amount of the article on the conveying unit of the conveyor apparatus, the conveyor apparatus is operated with high consumption power although the article does not need to be conveyed. For that reason, the conveyor apparatus consume power uselessly.

The weighing apparatus according to an aspect of the present invention includes the conveyor apparatus. The conveyor apparatus can decrease the conveying force when the article is not supplied to the conveying unit and/or the article adheres to the conveying unit so that the article is not conveyed. For that reason, the conveyor apparatus does not consume power uselessly when there is no need to convey an article in the conveying unit. Thus, in the conveyor apparatus of the combined weighing apparatus, power consumption can be reduced and hence an efficient operation can be realized.

According to an aspect of the present invention, it is possible to realize an efficient operation.

DETAILED DESCRIPTION

Figure 1:
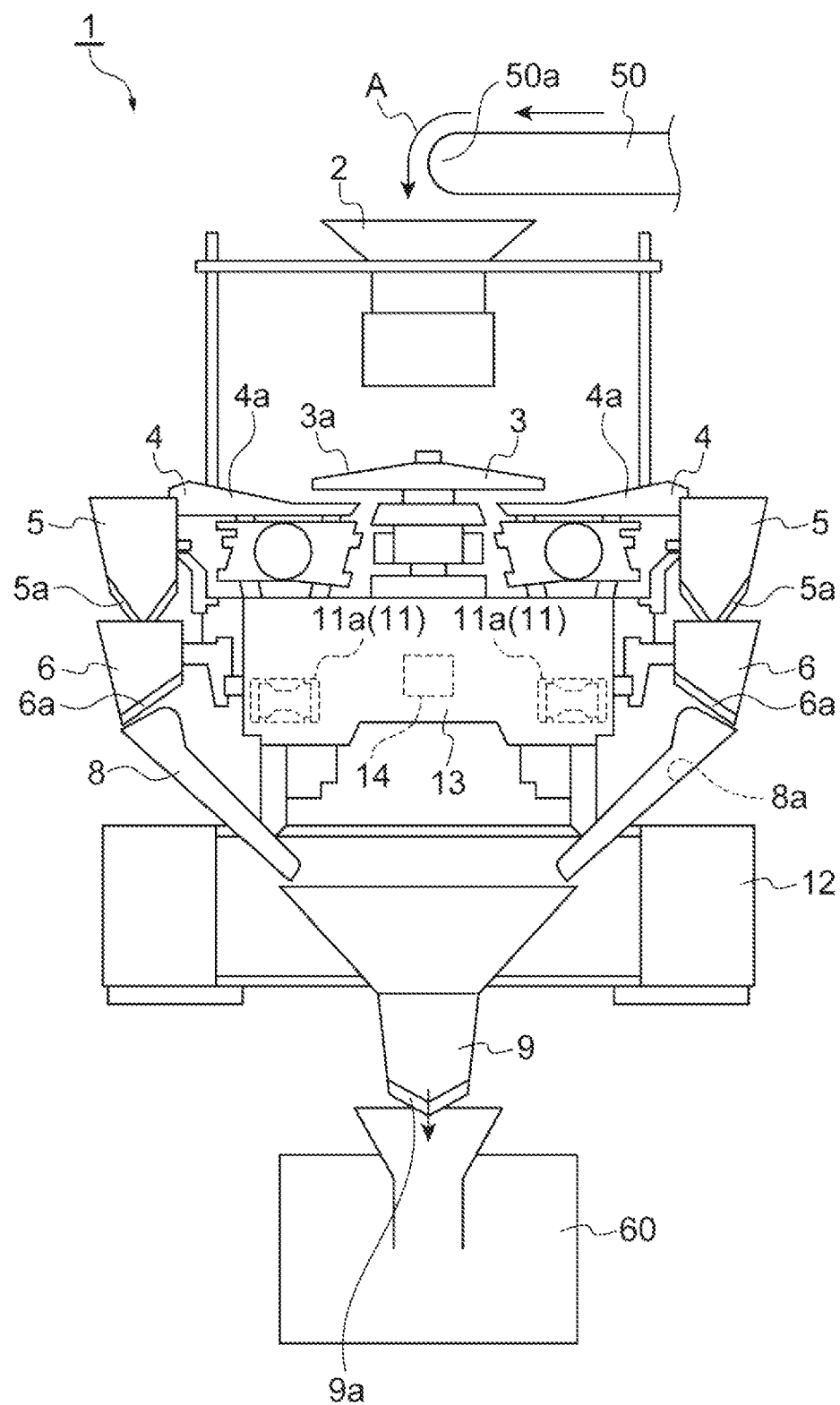
FIG. 1 is a configuration diagram of a combined weighing apparatus according to an embodiment.

Hereinafter, a preferred embodiment of the present invention will be described with reference to the accompanying drawings. Furthermore, the same reference numerals will be given to the same or corresponding components in the description of the drawings and a repetitive description will be omitted.

As shown in FIG. 1, a combined weighing apparatus 1 includes an input chute 2, a dispersion feeder (a conveying unit) 3, a plurality of radiation feeders (conveying units) 4, a plurality of pool hoppers 5, a plurality of weighing hoppers 6, a collection chute 8, a timing hopper 9, a weighing unit 11, and a control unit (a combined control unit) 14. The combined weighing apparatus 1 weighs articles A (articles having variations in unit mass such as agricultural products, fishery products, and processed foods) supplied by the conveying conveyor 50 so that they have target measured weight values and are supplied to a bag manufacturing and packaging machine 60. Furthermore, the bag manufacturing and packaging machine 60 packs the articles A weighed and supplied by the combined weighing apparatus 1 while forming a film into a bag of a predetermined capacity.

The input chute 2 is disposed below a conveying end 50a of the conveying conveyor 50. The input chute 2 receives the article A conveyed by the conveying conveyor 50 from the outside and dropped from the conveying end 50a of the conveying conveyor 50 and discharges the article downward.

Figure 2:
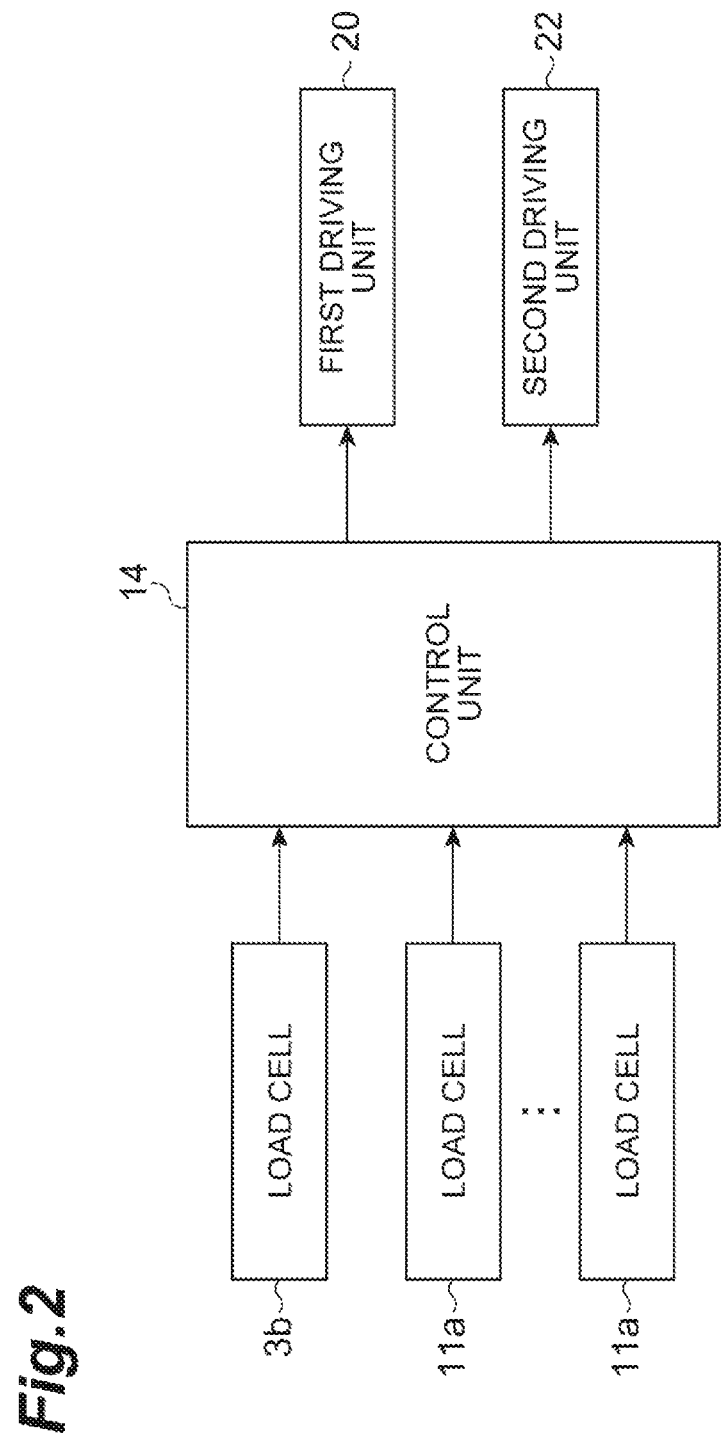
FIG. 2 is a block diagram showing a configuration of the combined weighing apparatus.

The dispersion feeder 3 is disposed below the input chute 2. The dispersion feeder 3 includes a conveying surface 3a having a conical shape spreading downward. The dispersion feeder 3 uniformly conveys the article A discharged from the input chute 2 to the top portion of the conveying surface 3a toward the outer edge of the conveying surface 3a in such a manner that the conveying surface 3a is vibrated by a first driving unit 20. The dispersion feeder 3 is supported by a load cell (the detection unit) 3b (see FIG. 2). The load cell 3b weighs a measured weight value corresponding to the mass of the article A when the article A is loaded on the dispersion feeder 3. The load cell 3b outputs a signal (detection result) indicating the measured weight value to the control unit 14.

The plurality of radiation feeders 4 are radially arranged along the outer edge of the conveying surface 3a of the dispersion feeder 3. Each radiation feeder 4 includes a trough 4a which extends outward from the lower side of the outer edge of the conveying surface 3a. Each radiation feeder 4 conveys the article A discharged from the outer edge of the conveying surface 3a toward the front end portion of the trough 4a in such a manner that the trough 4a is vibrated by a second driving unit 22.

The plurality of pool hoppers 5 are arranged to surround, for example, a center line (not shown) parallel to the vertical direction. Each pool hopper 5 is disposed below the front end portion of the trough 4a of each radiation feeder 4. Each pool hopper 5 includes a gate 5a which is opened and closed with respect to the bottom portion. Each pool hopper 5 temporarily stores the article A discharged from the corresponding radiation feeder 4 by closing the gate 5a. Further, each pool hopper 5 discharges the temporarily stored article A downward by opening the gate 5a.

The plurality of weighing hoppers 6 are arranged to surround, for example, the center line. Each weighing hopper 6 is disposed below the gate 5a of each pool hopper 5. Each weighing hopper 6 includes a gate 6a which is opened and closed with respect to the bottom portion. Each weighing hopper 6 temporarily stores the article A discharged from the corresponding pool hopper 5 by closing the gate 6a. Further, each weighing hopper 6 discharges the temporarily stored article A by opening the gate 6a.

The collection chute 8 collects the article A discharged from each weighing hopper 6. The collection chute 8 is disposed so that an inner surface 8a is located below all weighing hoppers 6. The collection chute 8 receives the article A discharged from each weighing hopper 6 by the inner surface 8a and discharges the article downward.

The timing hopper 9 is disposed below the collection chute 8. The timing hopper 9 includes a gate 9a which is opened and closed with respect to the bottom portion. The timing hopper 9 temporarily stores the article A discharged from the collection chute 8 by closing the gate 9a. Further, the timing hopper 9 discharges the temporarily stored article A to the bag manufacturing and packaging machine 60 by opening the gate 9a.

The input chute 2, the dispersion feeder 3, the plurality of radiation feeders 4, the plurality of pool hoppers 5, and the plurality of weighing hoppers 6 are directly or indirectly supported by a casing 13. The collection chute 8 and the timing hopper 9 are directly or indirectly supported by a frame 12.

The weighing unit 11 is disposed inside the casing 13 supported by the frame 12. The weighing unit 11 includes a plurality of load cells 11a. Each load cell 11a supports the corresponding weighing hopper 6. The weighing unit 11 weighs the measured weight value corresponding to the mass of the article A when the article A is temporarily stored in each weighing hopper 6.

The control unit 14 is disposed inside the casing 13. The control unit 14 includes a Central Processing Unit (CPU), a Read Only Memory (ROM), a Random Access Memory (RAM), and the like. The control unit 14 controls the operations of respective units of the combined weighing apparatus 1 such as the conveying operations of the dispersion feeder 3 and the radiation feeder 4, the opening and closing operations of the gates 5a of the pool hoppers 5, the opening and closing operations of the gates 6a of the weighing hoppers 6, and the opening and closing operation of the gate 9a of the timing hopper 9. The control unit 14 is connected to the bag manufacturing and packaging machine 60 to communicate therewith.

The control unit 14 stores the measured weight value weighed by the weighing unit 11 to be correlated with the weighing hopper 6 storing the article A corresponding to the measured weight value. The control unit 14 selects a combination of the measured weight values so that a total value becomes a target measured weight value from the plurality of measured weight values weighed by the weighing unit 11 and correlated with the weighing hoppers 6. More specifically, the control unit 14 selects a combination of the measured weight values from the plurality of measured weight values output from the weighing unit 11 so that the total value falls within a predetermined range in which the target measured weight value is a lower limit value. Then, the control unit 14 discharges the article A to the weighing hopper 6 corresponding to the combination.

The control unit 14 sets the conveying force of the dispersion feeder 3 and the radiation feeder 4 to be smaller than the current conveying force when a state in which the change amount of the loading amount of the article A on the dispersion feeder 3 is smaller than the threshold value is maintained for a predetermined time or more in the measurement result of the load cell 3b. The control unit 14 sets the conveying force of the dispersion feeder 3 and the radiation feeder 4 to be larger than the current conveying force when a state in which the change amount is smaller than the threshold value is maintained for a first predetermined time T1 or more. The control unit 14 sets the conveying force of the dispersion feeder 3 and the radiation feeder 4 to be smaller than the current conveying force when a state in which the change amount is smaller than the threshold value is maintained for a second predetermined time T2 or more. The threshold value may be set in response to the article A or may be appropriately set on the basis of an experiment, a test, or the like.

The control unit 14 calculates the loading amount of the article A on the dispersion feeder 3 on the basis of a weighing signal output from the load cell 3b. The control unit 14 acquires the change amount of the loading amount when calculating the loading amount of the article A on the dispersion feeder 3. The change amount of the loading amount is a movement average. The control unit 14 determines whether a state in which the change amount is smaller than the threshold value is maintained for a first predetermined time T1 or more when acquiring the change amount. The first predetermined time T1 may be set in response to the article A or may be appropriately set on the basis of an experiment, a test, or the like.

The control unit 14 sets the conveying force of the dispersion feeder 3 and the radiation feeder 4 to be larger than the current conveying force when a state in which the change amount is smaller than the threshold value is maintained for the first predetermined time T1 or more. Specifically, the control unit 14 controls the operations of the first driving unit 20 and the second driving unit 22 so that the conveying force becomes a second conveying force equal to or larger than a first conveying force when the current conveying force is the first conveying force. The first conveying force and the second conveying force are appropriately set in response to the article A. The control unit 14 changes the conveying force by changing parameters for controlling the operations of the first driving unit 20 and the second driving unit 22. The parameters are, for example, a setting value, a current value, and like.

the control unit 14 determines whether a state in which the change amount is smaller than the threshold value is maintained for the second predetermined time T2 or more. The control unit 14 sets the conveying force of the dispersion feeder 3 and the radiation feeder 4 to be smaller than the current conveying force when a state in which the change amount is smaller than the threshold value is maintained for the second predetermined time T2 or more. The second predetermined time T2 is a time longer than the first predetermined time T1 (T1<T2) and may be set in response to the article A or may be appropriately set on the basis of an experiment, a test, or the like.

The control unit 14 sets the conveying force of the dispersion feeder 3 and the radiation feeder 4 to be smaller than the current conveying force when a state in which the change amount is smaller than the threshold value is maintained for the second predetermined time T2 or more. Specifically, the control unit 14 controls the operations of the first driving unit 20 and the second driving unit 22 so that the conveying force becomes the third conveying force corresponding to the first conveying force or less and the second conveying force or less (third conveying force<first conveying force<second conveying force) when the current conveying force is the second conveying force. The third conveying force is appropriately set in response to the article A.

The control unit 14 sets the conveying force of the dispersion feeder 3 and the radiation feeder 4 to be larger than the current conveying force when a state in which the change amount is the threshold value or more is maintained for a third predetermined time T3 or more after decreasing the conveying force. The control unit 14 sets the conveying force of the dispersion feeder 3 and the radiation feeder 4 to be larger than the current conveying force (the third conveying force) when a state in which the change amount is the threshold value or more is maintained for the third predetermined time T3 or more after setting the conveying force of the dispersion feeder 3 and the radiation feeder 4 to the third conveying force. The third predetermined time T3 is a time shorter than the first predetermined time T1 and the second predetermined time T2 (T3<T1<T2). The control unit 14 controls the operations of the first driving unit 20 and the second driving unit 22 so that the conveying force becomes the first conveying force when a state in which the change amount is the threshold value or more is maintained for the third predetermined time or more.

Next, an operation of the combined weighing apparatus 1 will be described with reference to FIG. 3.

Figure 3:
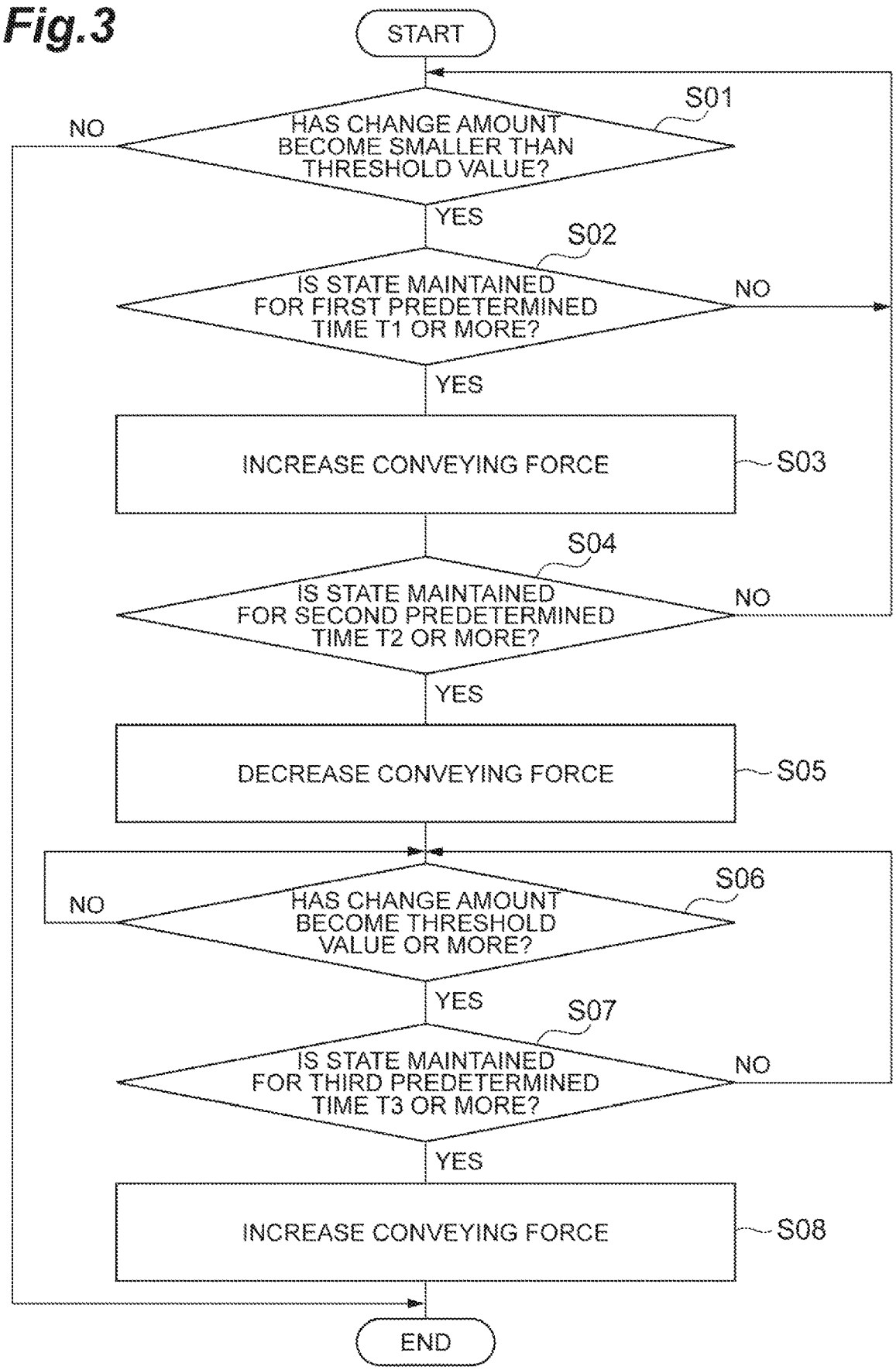
FIG. 3 is a flowchart showing an operation of the combined weighing apparatus.

As shown in FIG. 3, the control unit 14 determines whether the change amount of the loading amount on the dispersion feeder 3 is smaller than the threshold value on the basis of the measured weight value of the load cell 3b (step S01). The control unit 14 causes the process to proceed to step S02 when it is determined that the change amount is smaller than the threshold value. The control unit 14 ends the process when it is not determined that the change amount is smaller than the threshold value (the change amount is the threshold value or more).

In step S02, the control unit 14 determines whether a state in which the change amount is smaller than the threshold value is maintained for the first predetermined time T1 or more. The control unit 14 increases the conveying force of the dispersion feeder 3 and the radiation feeder 4 (to be the second conveying force) when it is determined that the state is maintained for the first predetermined time T1 or more (step S03). The control unit 14 returns to the process of step S01 when it is not determined that the state is maintained for the first predetermined time or more.

The control unit 14 determines whether a state in which the change amount is smaller than the threshold value is maintained for the second predetermined time T2 or more (step S04). The control unit 14 decreases the conveying force of the dispersion feeder 3 and the radiation feeder 4 (to be the third conveying force) when it is determined that the state is maintained for the second predetermined time T2 or more (step S05). The control unit 14 returns to the process of step S01 when it is not determined that the state is maintained for the second predetermined time or more.

The control unit 14 determines whether the change amount of the loading amount on the dispersion feeder 3 is the threshold value or more (step S06). The control unit 14 causes the process to proceed to step S07 when it is determined that the change amount is the threshold value or more. The control unit 14 repeats the same process (step S06) when it is not determined that the change amount is the threshold value or more.

In step S07, the control unit 14 determines whether a state in which the change amount is the threshold value or more is maintained for the third predetermined time T3 or more. The control unit 14 increases the conveying force of the dispersion feeder 3 and the radiation feeder 4 (to be the first conveying force) when it is determined that the state is maintained for the third predetermined time T3 or more (step S08). The control unit 14 returns the process to step S06 when it is not determined that the state is maintained for the first predetermined time or more.

As described above, in the combined weighing apparatus 1 according to the embodiment, the conveying force of the dispersion feeder 3 and the radiation feeder 4 is set to be smaller than the current conveying force when a state in which the change amount of the loading amount of the article A on the dispersion feeder 3 is smaller than the threshold value is maintained for a predetermined time or more. Accordingly, in the combined weighing apparatus 1, the conveying force can be decreased when the article A is not supplied to the dispersion feeder 3 and/or the article A adheres to the dispersion feeder 3 so that the article A is not conveyed. For that reason, in the combined weighing apparatus 1, power is not uselessly consumed when there is no need to convey the article A in the dispersion feeder 3 and the radiation feeder 4. Thus, in the combined weighing apparatus 1, power consumption can be reduced and hence an efficient operation can be realized. Further, in the combined weighing apparatus 1, it is possible to reduce a load for the dispersion feeder 3 and the radiation feeder 4 and to improve durability.

In the combined weighing apparatus 1, when the loading amount of the article A on the dispersion feeder is small, the conveying force of the dispersion feeder 3 and the radiation feeder 4 is increased so that an article supply amount per unit time for each weighing hopper 6 does not decrease. Accordingly, in the combined weighing apparatus 1, since it is possible to secure the number of the weighing hoppers 6 used to calculate the combination, a deterioration of operation efficiency is suppressed. Here, the combined weighing apparatus 1 does not need to perform a combination weighing process when the article A is not supplied to the combined weighing apparatus 1. In this state, when the loading amount of the article A on the dispersion feeder 3 is decreased and the conveying force of the dispersion feeder 3 and the radiation feeder 4 is increased, the conveyor apparatus is operated with high power consumption although the article A does not need to be conveyed. For that reason, the conveyor apparatus consumes power uselessly.

In the combined weighing apparatus 1 according to the embodiment, the control unit 14 sets the conveying force of the dispersion feeder 3 and the radiation feeder 4 to be larger than the current conveying force when a state in which the change amount is smaller than the threshold value is maintained for the first predetermined time T1 or more. The control unit 14 sets the conveying force of the dispersion feeder 3 and the radiation feeder 4 to be smaller than the current conveying force when a state in which the change amount is smaller than the threshold value is maintained for the second predetermined time T2 or more. In this configuration, it is possible to suppress a decrease in the supply amount of the article A per unit time for each weighing hopper 6 by setting the conveying force of the dispersion feeder 3 and the radiation feeder 4 to be larger than the current conveying force when a state in which the change amount is smaller than the threshold value is maintained for the first predetermined time T1 or more. Accordingly, it is possible to suppress deterioration of operation efficiency of the combined weighing apparatus 1. Meanwhile, in the combined weighing apparatus 1, it is possible to realize an efficient operation by setting the conveying force of the dispersion feeder 3 and the radiation feeder 4 to be smaller than the current conveying force when a state in which the change amount is smaller than the threshold value is maintained for the second predetermined time T2 or more.

In the combined weighing apparatus 1 according to the embodiment, the control unit 14 may set the conveying force of the conveying unit to be larger than the current conveying force when a state in which the change amount is the threshold value or more is maintained for the third predetermined time T3 or more after decreasing the conveying force. In this configuration, it is possible to increase the conveying force of the dispersion feeder 3 and the radiation feeder 4 when the article A is stably supplied to the dispersion feeder 3. Thus, in the combined weighing apparatus 1, since the conveying force is not increased in a state in which the article A is temporarily supplied, it is possible to realize a more efficient operation.

Although the embodiment of the present invention has been described, the present invention is not essentially limited to the above-described embodiment and can be modified into various forms without departing from the spirit.

In the above-described embodiment, an example has been described in which the control unit 14 sets the conveying force of the dispersion feeder 3 and the radiation feeder 4 to be larger than the current conveying force when a state in which the change amount is the threshold value or more is maintained for the third predetermined time T3 or more after decreasing the conveying force. However, the control unit 14 may set the conveying force of the dispersion feeder 3 and the radiation feeder 4 to be larger than the current conveying force when the change amount is the threshold value or more. In this configuration, it is possible to immediately increase the conveying force of the dispersion feeder 3 and the radiation feeder 4 when the article A is supplied to the dispersion feeder 3. For that reason, it is possible to promptly cope with a change in state in the combined weighing apparatus.

In the above-described embodiment, an example of conveying the article A by the vibration of the dispersion feeder 3 has been described. However, the dispersion feeder 3 may convey the article A by rotating the conveying surface 3a. In this configuration, the conveying force of the article A may be controlled by controlling a rotation speed and a rotation amount.

In the above-described embodiment, an example of conveying the article A by the vibration of the radiation feeder 4 has been described. However, the radiation feeder 4 may convey the article A by a rotatable coil unit (screw) or a belt conveyor. In the case of the coil unit, the control unit 14 controls a rotation speed (rpm) of the coil unit as a conveying force. Further, in the case of the belt conveyor, the control unit 14 controls the number of times of rotation of a roller driving a belt.

In the above-described embodiment, an example of changing the conveying forces of the dispersion feeder 3 and the radiation feeder 4 has been described. However, the conveying force of at least one of the dispersion feeder 3 and the radiation feeder 4 may be changed.

In the above-described embodiment, an example of detecting the loading amount of the article A loaded on the dispersion feeder 3 has been described. However, the loading amount of the article A on the radiation feeder 4 may be detected. Alternatively, the loading amount of the article A on the dispersion feeder 3 and the radiation feeder 4 may be detected.

In the above-described embodiment, an example of detecting the loading amount of the article A on the dispersion feeder 3 by the load cell 3b of the dispersion feeder 3 has been described. However, the loading amount of the article A on the dispersion feeder 3 may be detected by other means. For example, the loading amount may be detected by an image process for an image captured by a camera, a distance measurement sensor, a measured weight value of the article A input to the weighing hopper 6 (a measured weight value of the load cell 11a), or the like.

In the above-described embodiment, an example in which the conveyor apparatus is provided in the combined weighing apparatus 1 has been described. However, the conveyor apparatus may be also applied to other apparatuses. For example, the conveyor apparatus may be also applied to the conveying conveyor 50.

What is claimed is:

1. A conveyor apparatus comprising:
a conveying unit which conveys an article supplied from the outside;
a detection unit which detects an amount of an article loaded on the conveying unit; and
a control unit which sets a force of conveying the article in the conveying unit on the basis of a detection result of the detection unit and controls an operation of the conveying unit,
wherein the control unit sets the conveying force of the conveying unit to be smaller than a current conveying force when a state in which a change amount of the article loading amount on the conveying unit is smaller than a threshold value is maintained for a predetermined time or more in the detection result of the detection unit, and
the control unit sets the conveying force of the conveying unit to be larger than the current conveying force when a state in which the change amount is smaller than the threshold value is maintained for a first predetermined time or more and sets the conveying force of the conveying unit to be smaller than the current conveying force when a state in which the change amount is smaller than the threshold value is maintained for a second predetermined time or more which is the predetermined time and is equal to or longer than the first predetermined time.

2. The conveyor apparatus according to claim 1, wherein the control unit sets the conveying force of the conveying unit to be larger than the current conveying force when the change amount is the threshold value or more after decreasing the conveying force.

3. The conveyor apparatus according to claim 1, wherein the control unit sets the conveying force of the conveying unit to be larger than the current conveying force when a state in which the change amount is the threshold value or more is maintained for a third predetermined time or more after decreasing the conveying force.

4. The conveyor apparatus according to claim 1, wherein the control unit changes parameters setting the conveying force of the conveying unit to change the conveying force of the conveying unit.

5. A combined weighing apparatus comprising:
the conveyor apparatus according to claim 1;
a plurality of weighing hoppers which temporarily store the article conveyed by the conveyor apparatus and calculate a measured weight value corresponding to the mass of the article; and
a combined control unit which calculates a combination of measured weight values so that a total value becomes a target value from the measured weight values respectively correlated with the plurality of weighing hoppers.

6. A combined weighing apparatus comprising:
the conveyor apparatus according to claim 2;
a plurality of weighing hoppers which temporarily store the article conveyed by the conveyor apparatus and calculate a measured weight value corresponding to the mass of the article; and
a combined control unit which calculates a combination of measured weight values so that a total value becomes a target value from the measured weight values respectively correlated with the plurality of weighing hoppers.

7. A combined weighing apparatus comprising:
the conveyor apparatus according to claim 3;
a plurality of weighing hoppers which temporarily store the article conveyed by the conveyor apparatus and calculate a measured weight value corresponding to the mass of the article; and
a combined control unit which calculates a combination of measured weight values so that a total value becomes a target value from the measured weight values respectively correlated with the plurality of weighing hoppers.

8. A combined weighing apparatus comprising:
the conveyor apparatus according to claim 4;
a plurality of weighing hoppers which temporarily store the article conveyed by the conveyor apparatus and calculate a measured weight value corresponding to the mass of the article; and
a combined control unit which calculates a combination of measured weight values so that a total value becomes a target value from the measured weight values respectively correlated with the plurality of weighing hoppers.

* * * * *